March 10, 1964 H. REINECKE, JR., ETAL 3,124,708

CURRENT-OPERATED DIODE LOGIC GATES

Filed Aug. 4, 1961 6 Sheets-Sheet 1

T = A + B'

T = AB'

A = 0, B = 0, T = 1

A = 0, B = 1, T = 0

A = 1, B = 0, T = 1

A = 1, B = 1, T = 1

T = AB + A'C

INVENTORS
HENRY REINECKE, JR.
KENNETH E. PERRY
RICHARD W. HOFHEIMER

BY Edward D. Thomas
AGENT

T = AB + A'C

T = (D'+ E)(A'B + C) + ABD

INVENTORS
HENRY REINECKE, JR.
KENNETH E. PERRY
RICHARD W. HOFHEIMER
BY Edward D. Thomas
AGENT

INVENTORS
HENRY REINECKE, JR.
KENNETH E. PERRY
RICHARD W. HOFHEIMER

BY Edward D. Thomas
AGENT

March 10, 1964 H. REINECKE, JR., ETAL 3,124,708

CURRENT-OPERATED DIODE LOGIC GATES

Filed Aug. 4, 1961 6 Sheets-Sheet 4

INVENTORS
HENRY REINECKE, JR.
KENNETH E. PERRY
RICHARD W. HOFHEIMER
BY Edward D. Thomas
AGENT

CURRENT-OPERATED DIODE LOGIC GATES

Filed Aug. 4, 1961

INVENTORS
HENRY REINECKE, JR.
KENNETH E. PERRY
RICHARD W. HOFHEIMER

BY Edward O. Thomas
AGENT

March 10, 1964 H. REINECKE, JR., ETAL 3,124,708

CURRENT-OPERATED DIODE LOGIC GATES

Filed Aug. 4, 1961

6 Sheets-Sheet 6

INVENTORS
HENRY REINECKE, JR.
KENNETH E. PERRY
RICHARD W. HOFHEIMER

BY Edward D. Thomas
AGENT 3,124,708

CURRENT-OPERATED DIODE LOGIC GATES

Henry Reinecke, Jr., Solana Beach, and Richard W. Hofheimer, Del Mar, Calif., and Kenneth E. Perry, Arlington, Mass., assignors to Massachusetts Institute of Technology, Cambridge, Mass., a corporation of Massachusetts Filed Aug. 4, 1961, Ser. No. 129,426
10 Claims. (Cl. 307—88.5)

This invention relates to digital logic circuits and more particularly to current-operated diode logic circuits which represent digital information by the direction of current flow.

A logic gate is a circuit having one or more inputs and one output which is functionally related to the inputs. The inputs are generally binary signals, either electrical voltage or current levels having two different possible states. The voltage-operated gate, as referred to in this application, consists of a diode circuit whose input and output variables are represented by voltages relative to some datum. In particular, the binary signals are positive and negative voltages with respect to zero volts or ground. The signal voltage, corresponding to a specific variable, is connected to either the anode or the cathode of the proper input diode; the polarity of the voltage defines the state of the variable. In contrast, the current-operated gate consists of a diode circuit employing current as the binary variable. The input current source is applied across the diode, and the state is defined by the direction of the current.

The literature contains many articles on the design of voltage-operated diode logic gates; perhaps the most complete one is by Yokelson and Ulrich, "Engineering Multistage Diode Logic Circuits," Trans. AIEE, Part I: Communications and Electronics 74, 466 (1955), which discusses many of the problems encountered when designing voltage-operated diode logic circuits and the resulting restrictions imposed by engineering considerations. Perhaps the major disadvantages of the voltage-operated gates are: (1) The restriction of the design to two or three cascaded stages of logic—which does not, in general, allow realization of minimal networks or alternately requires the insertion of a gain device to re-establish the voltage levels; and (2) the coupling due to common grounds, which is more objectionable at higher switching speeds. Furthermore, multistage circuits require increased input power and ultimately limit the practicality of this approach. The voltage-operated gate in practice has its load resistor returned to a source of bias voltage, common to a large number of gates for reasons of economy, which produces the common-ground coupling problem.

The current-operated diode gate is capable of being cascaded with other current-operated gates to produce a multistage network where the number of stages is greater than that usually obtained by cascading voltage-operated gates. Moreover, this cascading is accomplished without the necessity for auxiliary bias-voltage sources and interstage load conductances as are required in voltage-operated gates. This is so because the current-operated gate utilizes the diode voltage drop in an advantageous manner. In addition, current-operated diode logic circuits can perform certain logical functions more economically than voltage-operated gates in terms of number of diodes required. Additionally, current-operated gates have ungrounded current sources which allows greater freedom for circuit design than is possible for voltage-operated gates which usually have grounded voltage sources.

The complementation operation assumes a unique meaning in current-operated systems because the reversal of a current may be accomplished by simply transposing the two lines connecting the gate output and its load.

Two types of current-operated gates are described in this application; both are equally general, and the choice is usually dictated by the form of the transmission function which is to be realized. The Boolean operations of addition and multiplication (commonly referred to as "or" and "and," respectively) are more economically obtained by using one of the basic types of current operated gates which will be designated the "and/or" gate; whereas the operation of sum modulo two is more economically obtained by using the "lattice" gate. Therefore, a complex transmission function will generally consist of an interconnection of these two types of circuits as will be more clearly shown in this application.

It is, therefore, an object of this invention to provide current-operated diode logic circuits which have fundamental transmission functions commonly referred to as "and," "or" and "sum modulo two" functions.

It is a further object of this invention to provide current-operated diode logic circuits which do not require external sources of bias.

It is a further object of this invention to provide current-operated logic circuits which may be connected directly to one another without the interposition of buffer stages or interstage conductances with bias sources in order to perform multistage logic for complex transmission functions.

Other features of the invention consist of certain novel combinations and arrangements of parts hereinafter described and particularly defined in the claims.

In the accompanying drawings:

FIGURE 1 shows the schematic diagrams of the current-operated add ("or") and multiply ("and") gate circuits.

FIGURE 2 has schematic diagrams showin gthe directions of current flow in the add gate of FIGURE 1*a* for the four possible input states.

Before considering the circuits shown in the figures, a few conventions may be stated: (*a*) diodes in series pointing up represent elements of add gates, (*b*) diodes in series pointing down represent elements of multiply gates, (*c*) if the input current direction arrow points up when the variable is in state 1, the input is represented by the unprimed literal; conversely, if the input current direction arrow points down when the variable is in state 1, the input is represented by the primed literal, and (*d*) current down through the load represents a transmission T of 1.

Figure 1A:
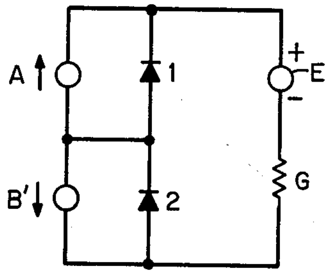
Figure 1B:
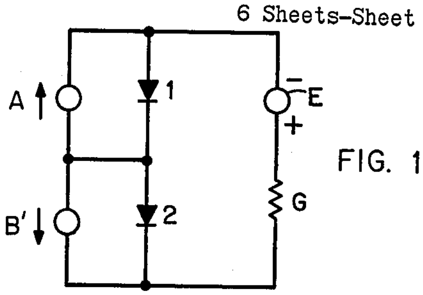
Figure 2A:
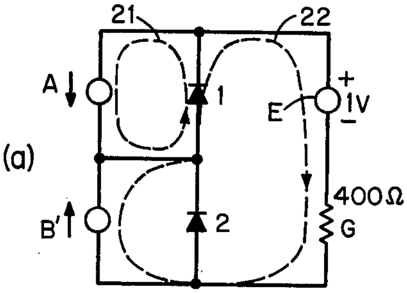
Figure 2B:
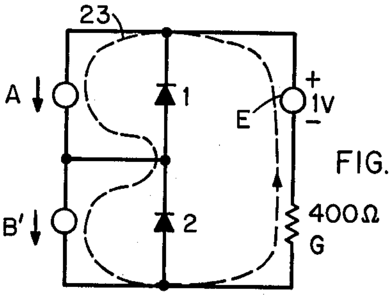
Figure 2C:
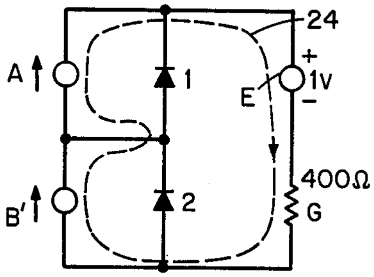
Figure 2D:
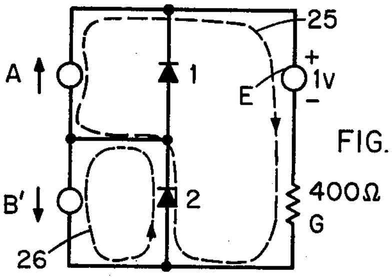

FIGURE 1(*a*) shows a current-operated add gate where the current sources A and B′ are connected across their respective diodes 1 and 2. The direction arrow associated with each current source shows the direction of current flow in the sources A, B′ for the state $A=B=1$. Since B′ is the complement of B, the state of B′ is 0. The current sources A and B′ are capable of producing a bidirectional current of substantially equal amplitude. The diodes 1 and 2 are considered to be ideal diodes which are defined to have infinite impedance to reverse current flow and zero voltage drop for forward current flow. A resistor G of high conductance forms the load. The voltage source E serves to reverse bias all diodes not forward biased by their associated current sources.

FIGURE 2 illustrates the current-operated add gate of FIGURE 1(*a*) with typical component values indicated. Determination of the transmission function T of this gate is accomplished by considering the four possible combinations of directions of current flow in current sources A and B′. These four combinations are shown in FIGURES 2(*a*) through 2(*d*). The magnitude of the current in source A and B′ and of the mesh currents 21 through 26 are each 0.5 ma. in the directions indicated on FIGURE 2. The diodes are considered to be ideal. The transmission T of the gate for the different input combinations is given by the direction of current in the load G. The path of mesh currents 21 through 26 is determined by first applying Kirchhoff's current law to the node points of FIGURE 2, to determine whether each diode 1 and 2 must, may possibly, or cannot conduct current. In the troublesome case where the diode may possibly conduct, it is necessary to apply Kirchhoff's voltage law to the loop which includes the "may possibly" conduct diode to determine whether the diode is required to conduct or required to be nonconducting. As an example, consider FIGURE 2(*b*) where both sources A and B′ are in a direction which may possibly cause diodes 1 and 2 to be conducting if Kirchhoff's current law is applied to their common node. If it is assumed that diode 1 is conducting, then diode 2 must of necessity conduct. Applying Kirchhoff's voltage law to the loop consisting of diodes 1 and 2, bias source E and load G produces a situation where the voltage drop across the conducting ideal diodes (0 volts), the voltage of bias source E (+1 volt) and the voltage across the load G (0 volts since of necessity no current flows in load G) when summed is not zero. This inconsistency means that diode 1 (and of necessity diode 2) is not conducting, which satisfies both Kirchhoff's current and voltage laws for the circuit of FIGURE 2(*b*). The voltage drop across the load G from mesh current 23 is 0.2 volt which subtracts from the 1.0 volt bias source E to produce a reverse bias of 0.8 volt across the nonconducting diodes 1 and 2 in series.

Using the convention that current down through the load represents a binary 1, the transmission function of the add gate of FIGURE 2 is seen to be represented by $T=A+B'$ since the transmission T is seen to be 1 when A or B′, or both A and B′ are 1.

The operation of the multiply gate of FIGURE 1(*b*) is not detailed since inspection of FIGURES 1(*a*) and 1(*b*) shows that the add and multiply gates are physically the same circuit. Therefore, the circuit of FIGURE 1 may be termed the "and/or" circuit. The conduction for a transmission of a 1 in FIGURE 1(*b*) requires a downward flowing current in load conductance G. There is only one state of the input variables A and B′ which will produce this downward flowing current: $A=1$, $B'=1$. The transmission function which satisfies the transmission characteristics of FIGURE 1(*b*) is, therefore, $T=AB'$.

Now, assume that diodes 1 and 2 of FIGURE 2 are commercially available semiconductor diodes, non-ideal diodes, having typical voltage-current characteristics. Note that a voltage drop will develop across a conducting diode which has the same polarity as voltage source E. This observation leads to the elimination of bias source E from the circuit and ultimately in more complex cascaded logic networks to the elimination of "floating" voltage bias sources.

*Realization and Design of Current-Operated Gates*

The realization of practical current-operated diode logic networks utilizes the diode voltage drop of actual diodes to advantage. The general principles of realization are established by first considering the simple multistage network of FIGURE 3 which represents the transmission function $T=AB+A'C$. The network direction arrows correspond to the state $A=B=C=1$. The circuit of FIGURE 3 uses ideal diodes. As suggested above, if the ideal diodes are replaced by nonideal diodes, it is possible to eliminate the three bias-voltage sources $E_1$, $E_2$, $E_3$ shown in FIGURE 3. Using an ideal diode in series with a voltage source as the equivalent circuit of a nonideal diode accounts for the forward drop of real diodes and is a good first-order approximation. $G_1$, $G_2$ and $G_3$ are relatively high conductances and hence virtually short circuits. They perform no logical function and may be short-circuited but it is desirable to retain $G_3$ to provide a means of voltage-sensing the direction of the load current.

Figure 3:
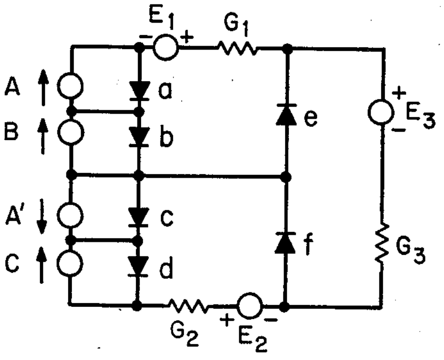
FIGURE 3 is a schematic diagram of a multistage circuit which has the transmission function $T=AB+A'C$ where the diodes are ideal and bias sources are used.
Figure 4:
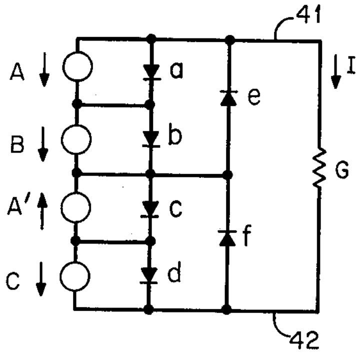
FIGURE 4 is a schematic diagram of a multistage circuit which has the transmission function $T=AB+A'C$ where the circuit uses ordinary non-ideal diodes and no external bias sources.

The network of FIGURE 4 is derived from that of FIGURE 3 after having replaced the ideal diodes by non-ideal diodes *a* through *f* and having removed the bias-voltage sources ($E_1$, $E_2$ and $E_3$) and conductances ($G_1$ and $G_2$). A complete analysis of this circuit is required to justify these changes. Since the system contains three variables, there are eight distinct input states for which the circuit operation must be determined. The non-ideal diode equivalent circuit consists of an ideal diode in series with a 0.24-volt source, which corresponds to the voltage drop across a typical germanium diode (Clevite Corp. type CTP–521) at a current of 1.0 ma. Although the logic level is 0.5 ma., it is seen below that any conducting diode always operates at a current equal to twice the logic level. The current sources are typically 0.5 ma., and the load resistance is equal to 40 ohms.

Referring to FIGURE 4, the first input state to be considered is $A=B=C=0$, and the polarity direction arrows of the current sources A, A′, B and C shown in FIGURE 4 correspond to this condition. Current source A′ causes diode *c* to conduct and allows the current to circulate in this mesh. A second mesh current is described by a path linking current sources A and B, conducting diode *c*, current source C, and is completed via the load G. Diodes *a*, *b*, *d*, *e* and *f* remain essentially nonconducting because of the bias applied across their associated branches. Kirchhoff's voltage law requires that the algebraic sum of the voltages around any closed loop must equal zero; and the terminal voltage of sources A, B and C and the diodes must assume values to meet this requirement. The voltage at the node joining diodes *a* and *b* is indeterminate, but if we assume the diodes to be identical the voltage across each would be the same.

Ideally, the magnitude of the load current I of FIGURE 4 (direction arrow associated with I shown for $T=1$) would be 0.50 ma.; the magnitude of the measured value is only 0.49 ma. due to the deviation of the actual non-ideal diode characteristic from that of the assumed equivalent circuit. In particular, the diodes *e* and *f* are biased by the 0.02 volt across the load G in a polarity to cause diodes *e* and *f* to conduct. In the assumed equivalent circuit for the non-ideal diode, the 0.24 volt source in series with each ideal diode would cause the ideal diode to have a negative voltage bias of 0.24 volt minus the applied positive voltage. Since the applied voltage across the series diodes *e* and *f* for the state of input variables under consideration is 0.02 volt, each of diodes *e* and *f* have applied voltages of 0.01 volt. Thus, the ideal diode would be far into its non-conducting voltage region by 0.23 volt. In actuality, the actual diodes *e* and *f* conduct a small amount of current because of the positive voltage of 0.01 volt applied across their respective terminals. The small amount of current flows through the diodes because their volt-ampere characteristic deviates from the ideal equivalent circuit characteristic; this causes the current in load G to be somewhat smaller than the current of 0.5 ma. in the current sources A, B, and C.

The remaining input states of FIGURE 4 will be discussed more briefly. In particular, to eliminate extensive repetition, the meshes will be described by indicating the sources and diodes which they include, using only the letter associated with each source and diode and ordering the letters to correspond to the direction of current flow. The two mesh currents for input states $A=B=0$, $C=1$ are: A—B—*e* (i.e., using this abbreviated form to indicate that the current from source A flows through source B and finally returns to source A via diode *e*) and C—A'—*e*—load G. Diodes *a, b* and *f* are obviously nonconducting, but diodes *c* and *d* shunt sources A' and C, respectively. These diodes *c, d* would ideally be nonconducting but due to the positive bias voltage present across these diodes a small amount of current will flow. The effect of such shunt paths is to reduce the actual output current.

Kirchhoff's voltage law applied around loop *d*—*c*—*e*—load G, dictates that the voltage across the series connected diodes *d* and *c* must be equal to the sum of the voltage across conducting diode *e* (0.24 volt) and the voltage across the 40 ohm load G (0.02 volt). This 0.26 volt is in a direction to cause diodes *d* and *c* to conduct and appears as 0.13 volt across each diode. The resultant current through non-ideal diodes *d* and *c* of approximately 0.06 ma. causes the load current I to be 0.44 ma. instead of 0.50 ma. The transmission is 1 because the output current is down through the load.

For completeness, the conducting meshes are tabulated below for the various possible input states. The current I in load G is seen to be less than 0.50 ma. because of the current in "nonconducting" diodes. The deviation of current I from 0.5 ma. varies in accordance with the magnitude of the current flowing in shunt paths which is a function of the voltage across "nonconducting" diodes.

*Tabulation*

$A=B=C=0$; $T=0$; I=0.49 ma.; A—B—*c*—C—load G; A'—*c*

$A=B=0$, $C=1$; $T=1$; I=0.44 ma.; A—B—*e*; C—A'—*e*—load G $A=C=0$, $B=1$; $T=0$; I=0.49 ma.; A—*b*—*c*—C—load G; A'—*c*; B—*b*

$A=0$, $B=C=1$; $T=1$; I=0.44 ma.; C—A'—*e*—load G; B—*b*; A—*b*—*e*

$A=1$, $B=C=0$; $T=0$; I=0.49 ma.; A—*a*; B—A'—C—load G—*a*

$A=C=1$, $B=0$; $T=0$; I=0.49 ma.; A—*a*; C—*d*; B—A'—*d*—load G—*a*

$A=B=1$, $C=0$; $T=1$; I=0.43 ma.; *f*—B—A—load G; A'—C—*f*

$A=B=C=1$; $T=1$; I=0.44 ma.; C—*d*; A'—*d*—*f*; *f*—B—A—load G

Reviewing the results of FIGURE 4, it is concluded that the auxiliary series bias-voltage sources $E_1$, $E_2$ and $E_3$ and the intermediate conductances $G_1$ and $G_2$ of FIGURE 3 may be replaced by short-circuits, and the ideal diodes *a*–*f* of FIGURE 3 replaced by nonideal diodes *a*–*f* of FIGURE 4. Furthermore, the realization of FIGURE 4 demonstrates the method of combining stages of current-operated gates. The two terms AB and A'C of the minimum-sum function, $T=AB+A'C$ are separately realized using multiply gates. The term AB is obtained by applying current sources A and B to two diodes *a, b* in series pointing down. Similarly, the term A'C is formed by applying current sources A' and C to two diodes *c, d* in series pointing down. Addition of the two terms AB and A'C is accomplished by a two-input add gate which requires two series-connected diodes *e, f* pointing up. Thus the outputs of the two multiply gates serve as inputs to the add gate which completes the realization.

The operation of complementation has a unique meaning in current-operated systems. Clearly, if the output lines 41 and 42 of the network in FIGURE 4 were transposed without changing the position of the load G, the current would flow through the load G in the opposite direction to that before line transposition. Retaining the original convention that current down through the load represents a transmission of 1, it is concluded that the transmission of the gate with transposed output lines 41 and 42 is the complement of the gate with untransposed lines. Another approach to this problem is the realization of the complementary transmission function, $$T=(A'+B')(A+C')$$

If this is carried out, the resulting network will be identical to that of FIGURE 4 revolved 180° about a horizontal centerline. This reorientation of the circuit reverses the direction of the sources and the diodes, interchanges the add and multiply gates, but the network remains unaltered. Hence, the realization of any specific transmission function is unique but indistinguishable from its complement. This property results from the fact that the output current is not referred to a specified reference current, as is the output voltage in voltage-operated systems.

Figure 5:
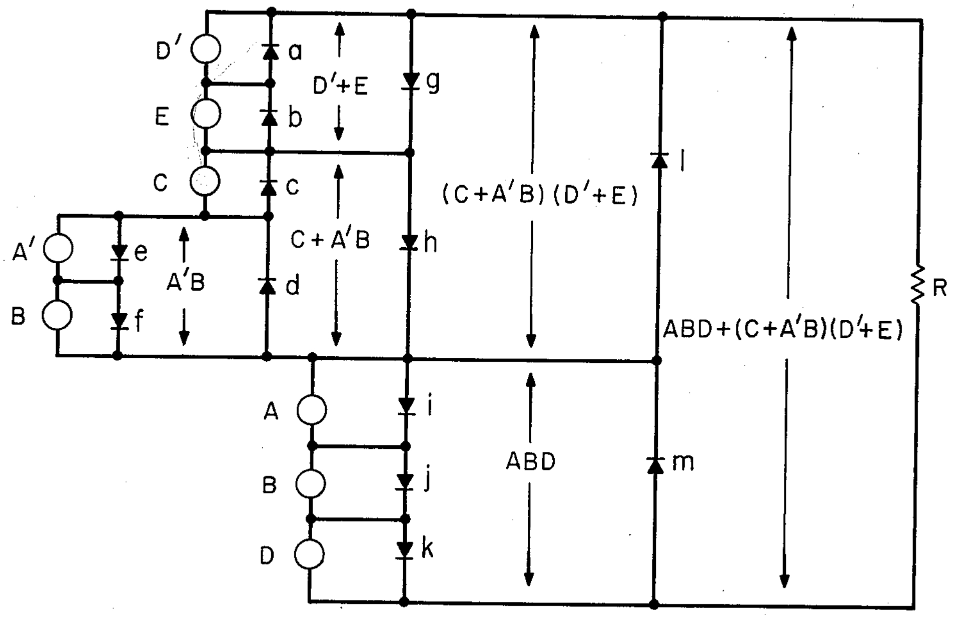
FIGURE 5 is a multistage circuit schematic diagram which has the transmission function $$T=ABD+(D'+E)(A'B+C)$$
Figure 6:
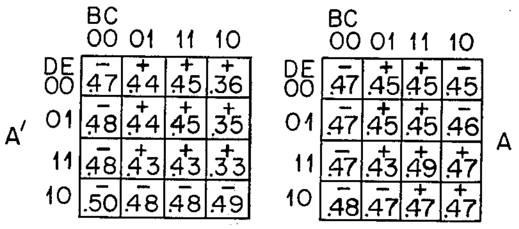
FIGURE 6 is a Karnaugh map of the output current of FIGURE 5 for the thirty-two possible input states.

The four-stage circuit of FIGURE 5 illustrates the application of the design techniques and the method of interconnecting the diodes to accomplish "logical" addition and multiplication. All current direction arrows on current sources A–E have been omitted, the appropriate convention being that the current source direction points up when the associated literal is in state 1; conversely, the source points down when the associated literal is in state 0. Hence, for the state A=B=C=D=E=1, all current sources are directed upward except those represented by primed literals. The rectifier symbols *a*–*m* are used to represent the actual non-ideal diodes. The given transmission function $T=ABD+(D'+E)(A'B+C)$ is realized by a series-parallel network of and/or gate circuits. A ±50 ma. center-reading milliammeter, having an impedance of approximately 40 ohms, can be used to indicate the load current direction and also constitutes the output load impedance R. The measured output currents in load R for the thirty-two input states are tabulated using the Karnaugh maps of FIGURE 6; a positive current represents a transmission of 1, and a negative current represents a transmission of 0. The partial conduction of "nonconducting" diodes causes the output current in load R to differ from 0.5 ma. A two-stage realization of the given transmission function T would require eighteen diodes, in contrast to the thirteen diodes used in the multistage network of FIGURE 5.

A complete design procedure may be outlined by examining the results of the two previous examples. Given a transmission function to be realized, it is clear that the number of inputs must equal the number of literals present in the transmission function. The first stage or stages, depending on the manner in which the expression was factored, represent the more subordinate portions of the transmission function. These stages will perform either the "logical" operation of addition or multiplication and must be realized accordingly. The outputs of these stages may be employed as inputs to succeeding stages in a manner identical to that for which the input is a current source. The resulting series-parallel diode network is the realization of the desired transmission function.

*Lattice Realization of Current-Operated Logic Networks*

Figure 7A:
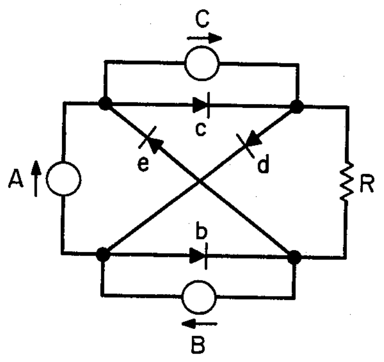
FIGURE 7 is the lattice network, which has the transmission function $T=AB+A'C$, drawn in two schematic diagrams having different configurations.
Figure 7B:
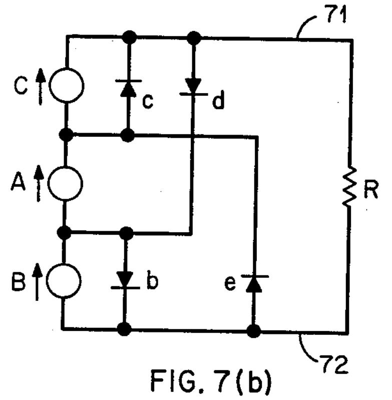

The "lattice method" of realizing current-operated diode logic networks uses four diodes connected in series to form a ring as the basic building block. The unique transmission characteristics of this configuration will be discussed for the generalized case. A four-diode lattice network is shown in FIGURE 7(*a*) and is redrawn in FIGURE 7(*b*) to more closely resemble the previous diagrams and to facilitate the application of the established conventions to this method. The direction arrows associated with sources A, B and C are shown for the state $A=B=C=1$. The rectifier symbols represent nonideal diodes *b*, *c*, *d* and *e* and the load impedance is R.

The lattice network of FIGURE 7 is a general three-input network and its transmission is represented by $T=AB+A'C$. The transmission function may be determined by considering those input states for which the transmission is unity. When $A=0$, the transmission is 1 for the input states $A'=B'=C=1(T=A'B'C)$, and $A'=B=C=1(T=A'BC)$ which reduces to the transmission function $T=A'C$ since unity transmission occurs for $B=0$ or 1 when $A=0$. Similarly, when $A=1$, the transmission is 1 for the input states $A=B=C'=1(T=ABC')$ and $A=B=C=1(T=A'BC)$. This reduces to the term $T=AB$ which when added to the term $T=A'C$ gives the network transmission function $T=AB+A'C$.

The principle of operation of the lattice circuit of FIGURE 7 parallels that of the "and/or" networks realized previously in this application, where it was observed that current circulates in various meshes depending upon the state of the input current sources, thereby establishing the direction of the current in a mesh which includes the load; current down through the load signifying a transmission of 1. All conducting diodes link two meshes, and the current in each diode is equal to twice the logic level. The eight measured values of output current in load R of FIGURE 7 were all approximately equal to 0.50 ma. and were obtained using a ±0.50 ma. center-reading milliammeter of 40 ohms as the load R. A tabulation of the primary current meshes in FIGURE 7 for the eight possible input states of current sources A, B and C follows:

$A=B=C=0$; $T=0$; C—A—B—R
$A=B=0, C=1$; $T=1$; A—B—*e*, *e*—C—R
$A=C=0, B=1$; $T=0$; B—*b*, C—A—*b*—R
$A=0, B=C=1$; $T=1$; B—*b*, A—*b*—*e*, *e*—*c*—R
$A=1, B=C=0$; $T=0$; C—C, A—*c*—*d*, *d*—B—R
$A=C=1, B=0$; $T=0$; A—C—*d*, *d*—B—R
$A=B=1, C=0$; $T=1$; C—*c*, B—A—*c*—R
$A=B=C=1$; $T=1$; B—A—C—R

As in the "and/or" circuits, the lattice circuit is subject to some load current being diverted from the primary meshes to secondary meshes which include "non-conducting" diodes. A comparison of the load currents of the "and/or" two-stage circuit of FIGURE 4 and the lattice circuit of FIGURE 7, which circuits have the same transmission function, shows that the "and/or" two-stage circuit has a much greater deviation of load current from the ideal value of 0.5 ma. than does the lattice circuit. This is a distinct advantage of the lattice circuit in addition to the advantage of only requiring three current sources instead of the four sources of FIGURE 4. The greater constancy in the magnitude of the load current in the lattice circuit is attributable to the lattice circuit non-conducting diodes being serially connected across the load R which for small values of load resistance has small voltage developed across it. A 40 ohm load with 0.5 ma. current sources will only develop 0.02 volt. This low voltage is to be contrasted with the voltage across serial non-conducting diodes of FIGURE 4 which for certain current input states is the voltage drop across a desirably conducting diode (0.24 volt) plus the small load voltage (0.02 volt). It is concluded that the maximum output current and minimum deviation from that maximum will result when a current-operated logic circuit is terminated with the smallest resistor which other considerations external to the logic circuit may allow.

Complementation of any of the variables contained in the transmission function ($T=AB+A'C$) of FIGURE 7 requires reversal of its associated current source. To complement the transmission function, the entire network may be revolved 180° about a horizontal centerline or the output lines 71 and 72 may be transposed. As noted earlier, the network for the transmission of the complement is unique and identical to that of the complemented function. The lattice realization of FIGURE 7 and the "and/or" realization of FIGURE 4 have the same transmission function, but a marked reduction in the required number of diodes occurs when the lattice is used. This economy feature is another advantage of the lattice network. One obvious difference of the lattice is that current source A is not associated with a specific diode and performs basically a function of path selection. Substitution of a current source B' for the current source C of FIGURE 7 results in a transmission function $$T=AB+A'B'=A\oplus B'$$

This function represents the operation of sum modulo two (alternately referred to as ring sum, circle sum, or "exclusive or") and finds many useful applications in digital systems.

Multistage gates may be realized by cascading a number of lattice networks or by employing the outputs of lattice networks as the inputs to another lattice network (i.e., replacing current sources B and C in FIGURE 7 by the outputs of lattice networks). A more general form of the transmission equation is $T=T_aT_b+T_a'T_c$, where the subscripts correspond to the input positions designated by the upper-case letters in the previous equation $T=AB+A'C$. This expression, $T=T_aT_b+T_a'T_c$, indicates that the inputs are not restricted to simple current sources but include currents derived from gate outputs.

Figure 8:
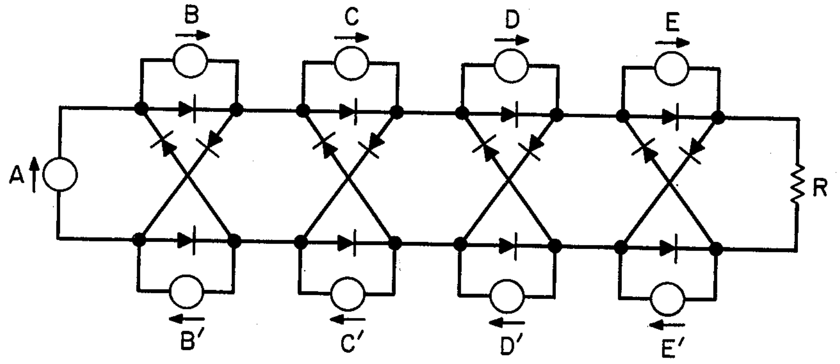
FIGURE 8 is a multistage cascaded lattice circuit schematic diagram which has the transmission function $T=A\oplus B\oplus C\oplus D\oplus E$.

The operation of sum modulo two on five literals A, B, C, D and E is accomplished by cascading four lattice configurations as shown in FIGURE 8. The transmission function may be directly determined as $$T=A\oplus B\oplus C\oplus D\oplus E$$

by observing that the transmission $T=A\oplus B$ of the first lattice is the input to a second lattice whose transmission is $T=A\oplus B\oplus C$ and so on. The magnitude of the measured output current in load R (40 ohms) of FIGURE 8 is approximately 0.40 ma. for all thirty-two possible input states where the input current sources are each approximately 0.50 ma. The uniformity of output load current is apparently a result of the symmetry of the network while the reduction in amplitude is primarily attributable to "nonconducting" diodes diverting current for the load R. A two-stage voltage-operated gate would require ninety-six diodes to realize the transmission function $T=A\oplus B\oplus C\oplus D\oplus E$ in contrast to the sixteen diodes used in the cascaded lattice realization.

*Hybrid and Multiple Output Circuits*

In general, any arbitrary transmission function may be realized using either and "and/or" circuit or the lattice circuit, although the number of diodes required may be different. A hybrid network, a network which uses both "and/or" and lattice circuits as elements of a more complex circuit, can sometimes realize a complex transmission function more minimally than a network consisting of "and/or" or lattice networks alone. By "more minimally" is meant either that the hybrid network requires fewer current sources or diodes than either the "and/or" or lattice network realizations.

Several complex transmission functions were encountered in the design of a static multiplier and hybrid networks were used in their realization. A static multiplier is a device capable of simultaneously multiplying two numbers without recourse to the accumulation of partial products or shifting operations. A transmission function T of the following form is needed for one of the carry functions of the multiplier:

$$T=M[L(J\oplus K)'+J(J\oplus K)+CDEF+ABGH]$$

where the letters A, B, C, D and E, F, G, H represent current sources corresponding to the multiplicand and multiplier respectively of a binary number, and J, K, L and M represent the current outputs of various transmission function gates used elsewhere in the multiplier.

Figure 9:
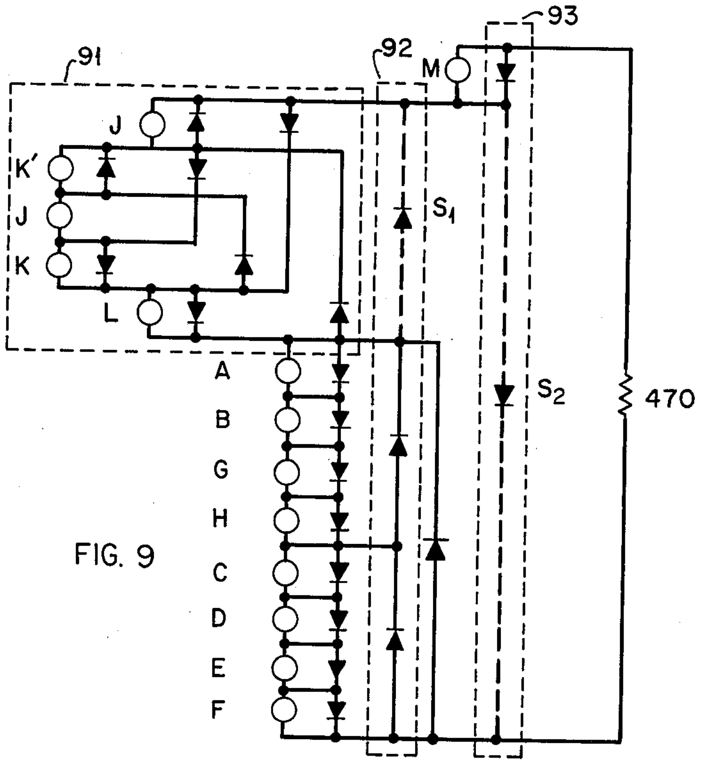
FIGURE 9 is a hybrid circuit schematic diagram combining circuits of FIGURE 1 with circuits of FIGURE 7 which has the transmission function $T=M[L(J\oplus K)'+J(J\oplus K)+CDEF+ABGH]$.

FIGURE 9 illustrates the circuit representing the above transmisison function T. This hybrid realization uses two cascaded lattice networks 91 to generate the portion of the function expressed by $L(J\oplus K)'+J(J\oplus K)$. The add circuit 92 was used to generate the sum of $$[L(J\oplus K)'+J(J\oplus K)]$$

CDEF, and ABGH. The last stage is a two-input multiply circuit 93 which multiplies the above sum by M. Two of the diodes of FIGURE 9, $s_1$ and $s_2$ were determined to be superfluous and were omitted in the actual network constructed. A discussion of the method for detecting superfluous diodes is presented later in this specification.

Another example of a hybrid circuit is the network (not shown) which realizes the transmission function $T=AD\oplus BC$. The sum modulo two function is obtained by a lattice network whose current inputs are AD, BC and B′C′ which are in turn the outputs of multiply circuits whose current inputs are A and D, B and C, and B′ and C′ respectively.

A single example of a multiple output realization will be presented to clarify the definition and to demonstrate the design technique. The particular pair of transmissions chosen for this illustration are the sum and carry functions associated with a parallel binary adder. If $A_i$ and $B_i$ are the addend and augend bits in the *i*th binary position, the sum ($S_i$) and carry ($C_i$) may be expressed as follows, using $C_{i-1}$ as the carry from the adjacent column toward the least-significant-bit end of the word.

$$S_i=C'_{i-1}(A_i\oplus B_i)+C_{i-1}(A_i\oplus B_i)'$$
$$C_i=A_i(A_i\oplus B_i)'+C_{i-1}(A_i\oplus B_i)$$

Figure 10:
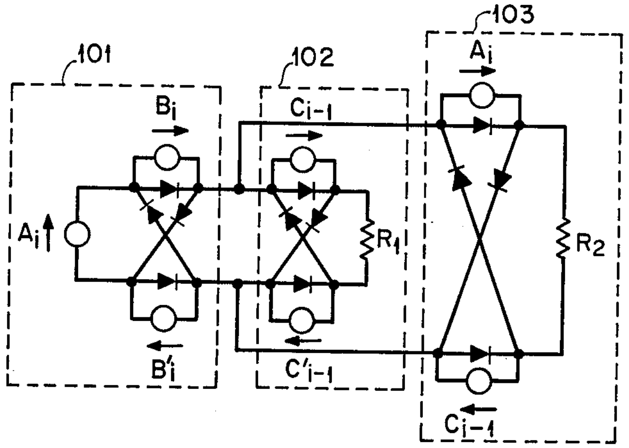
FIGURE 10 is a schematic diagram of a multiple-output lattice circuit.

The sum modulo two of $A_i$ and $B_i$, and its complement, are both present in the carry and the sum; therefore, we may realize this portion ($A_i\oplus B_i$) of the function separately, and use it as a common input. A simple lattice network 101 having this transmission is shown in FIGURE 10, with its output applied to the inputs of two other lattice networks 102, 103. Straightforward realization produces the sum transmission function $S_i$ in load $R_1$ and the carry function $C_i$ in load $R_2$. Since the first lattice 101 is required to supply current to two lattices 102, 103 in parallel, the logic levels in the first lattice 101 (i.e., the magnitude of current sources $A_i$, $B_i$ and $B_i'$) must be doubled at all three inputs. This output current then divides equally, producing the proper output levels for the sum and carry lattice networks 102, 103. The economy of this multiple output realization as compared to a two-state voltage-operated gate realization is substantial. For the latter, twenty-five diodes are required—sixteen diodes for the sum and nine for the carry. A saving in excess of 50 percent is achieved by using the multiple output lattice network of FIGURE 10 consisting of twelve diodes.

*Practical Design Considerations*

A current source may be defined as a source which delivers a predetermined current to a load regardless of the magnitude of the resistance of the load connected to the current source. A reasonable approximation to a current source is obtained by using a voltage source in series with a resistor; which resistors are of sufficiently high resistance with respect to the range of load resistors to be connected thereto to cause the voltage source to deliver essentially constant current over the load resistor range. It has been found that a flip-flop circuit, such as that described by R. H. Baker, "Boosting Transistor Switching Speed," Electronics, Vol. 30, No. 3, page 192, Fig. 10, March 1, 1957, whose output terminals are each connected through a high value resistor to the relatively low impedance of either a single conducting diode or a series circuit of conducting diodes and current sources is a good approximation to a current source. The potential difference measured at the output terminals of the flip-flop should be large in comparison to the voltage across one or more conducting diodes.

Where a specific literal (representing a current source) is repeated in the transmission function, or where it occurs more than once in a system composed of many transmission circuits, a single flip-flop can provide relatively independent current sources by using a separate pair of output terminal resistors for each separate load connection. The complemented current source may be obtained by interchanging the connections of the output terminal load resistors so that the current in a load will be reversed thereby.

The magnitude of the current to be used to represent the logic levels is a slightly involved problem. If the same variable is required many times, the load may exceed the current capacity of the flip-flop and necessitate the use of a differential-amplifier current buffer circuit. Furthermore, the actual diode volt-ampere characteristic must be considered because severe current and voltage imbalances may result in marginal circuit performance. This item will be more fully discussed subsequently. The static multiplier, mentioned earlier was designed employing flip-flops and current buffers having output voltages of ±5 volts, providing a voltage difference magnitude of 10 volts between output terminals. Output terminal resistors were 10K ohms with the result that the logic level was 0.50 ma. This set of values proved to be very satisfactory from the standpoint of loading by the gates and providing sufficient current in the load.

Figure 11:
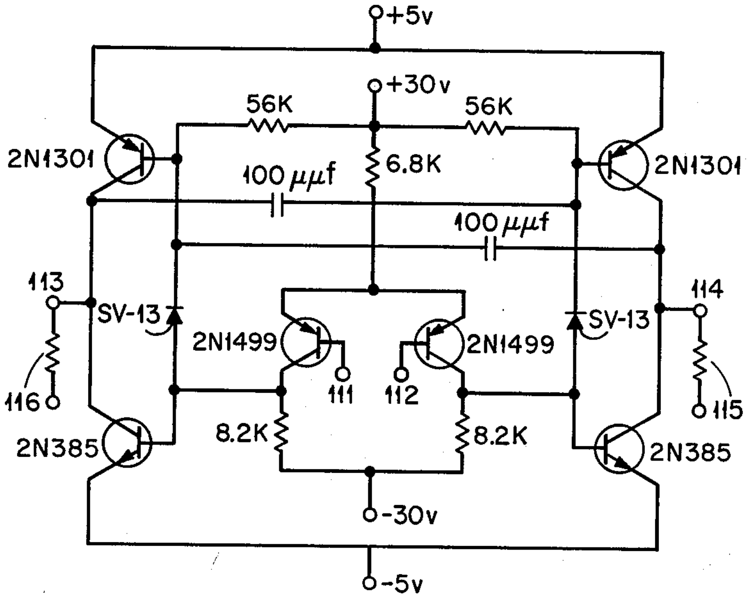
FIGURE 11 is a schematic circuit diagram of a differential-amplifier current buffer.

The static multiplier design contained multistage logic circuits which were terminated with 470 ohm load resistors. The 470 ohm value of load resistance produces sufficient voltage drop (0.23 volt max.) to actuate the differential amplifier current buffer of FIGURE 11 reliably. Gain is provided by the circuit of FIGURE 11, and the output voltage appears at terminals 113, 114 to which high impedance resistors 115 and 116, typically 10*K* ohms, are connected to present essentially a current source to a low impedance load. The differential amplifier is characterized by low gain for common mode signals at input terminals 111, 112 (which occasionally are present across gate output load resistors) and high gain for difference signals appearing across the gate load resistor. Multiple output current sources may be obtained from the current buffer of FIGURE 11 as with the flip-flop circuit by additional resistors in parallel with resistors 115 and 116.

Voltage and current imbalance in a current-operated gate circuit may result from one or more of the following causes: (*a*) variations in flip-flop or buffer output voltages, (*b*) non-uniformity of resistors due to their tolerances, (*c*) finite voltage drop across conducting diodes, (*d*) small currents in "non-conducting" diodes, and (*e*) loading by the detector which senses the output current. In general, the effect of these imbalances is a reduction in magnitude of the 0 and 1 current outputs in the load. A few typical examples will be discussed which illustrate the practical problems involved in designing current-operated diode logic circuits.

A simple two-input add gate, shown in FIGURE 2, serves to illustrate the effect of unequal amplitude current sources. Assume the current source input directions to be as indicated on the diagram of FIGURE 2($b$), but let the magnitude of source A be 0.4 ma. and determine the remaining currents. Current source B′ will deliver its specified 0.5 ma., of which 0.4 ma. must flow through the load G and source A, and 0.1 ma. must flow through the diode 2 faced by the source B. The diode 2 will conduct although theoretically it is to remain nonconducting. For this simple network, the effect of the unbalanced current is almost trivial; it simply reduces the output current in load G. In more elaborate networks, the conducting diodes would establish "sneak paths" which could adversely affect the performance of the circuit. However, slight imbalances of the order of 5 percent to 10 percent are tolerable because the volt-ampere ($v$.-I) characteristics of non-ideal diodes exhibit a small voltage drop across the diode at very small currents. The assumption was made above that the currents were unequal, although no reason was given for this inequality. If the inequality was due to unequal input voltages or unequal high series resistances between the flip-flop output terminals and the networks, the previous statements would apply only if the errors were symmetrical. This brings up the problem of errors due to voltage imbalance, which is perhaps the more serious problem because it occurs in current-operated diode gates where the current sources are approximated by using the flip-flop voltage output plus large output terminal series resistors.

If the currents are derived as was suggested, using flip-flops and large series resistances, all current sources would essentially be commonly connected. Assume the flip-flop outputs to be +E and −E, symetrical about zero volts or ground, connect identical large resistances to each output, and then connect these resistances to a load. If the load were a short circuit, the potential of this point with respect to ground would be zero volts. Hence, if the inputs are symmetrical with respect to ground, it would be desirable to have all portions of a current-operated network at this ground potential. This requirement cannot be satisfied for a current-operated diode gate due to the finite voltage drop exhibited by a conducting, non-ideal diode. To emphasize this condition, consider a twenty-input multiply gate of which nineteen inputs are in state 1. The cumulative voltage across the nineteen conducting diodes would be approximately 4.5 volts. It is obvious that this voltage will severely unbalance the flip-flop approximations to input current sources if the flip-flop terminal voltage is only ±5.0 volts. Furthermore, the terminal voltage of the current source associated with the 0 input of the example would have to exceed 4.5 volts (and be of opposite polarity) to cause the current in the load to flow in the proper direction. A solution to this problem, using a multistage network, consists of dividing the network into several first-stage multiply gates, each having only four or five inputs. The second stage would also be a multiply gate, and its inputs would be the outputs of the first-stage multiply gates. In terms of circuit particulars, equal groups of diodes would be be shunted by a single diode, pointed in the same direction. This procedure could be extended to several stages if necessary.

Multistage networks are generally formed by cascading alternately add and multiply gates; the circuit will, therefore, contain several columns of diodes, the diodes in adjacent columns being oppositely polarized. The over-all voltage imbalance is usually less severe in the typical case because the voltage drops across diodes pointed up will tend to be canceled by the drops across diodes pointed down. It has been demonstrated (as by FIGURES 5, 9 and 10) that practical multistage networks can be designed using current-operated techniques. Factored transmission expressions require fewer literals than the equivalent lower-order functions. Since each literal represents a required current source input, higher-order functions require fewer inputs. Any reduction in the number of inputs is advantageous in limiting the detrimental effects of voltage and current imbalance. All items discussed thus far may be classified as engineering problems. In most cases, several acceptable solutions exist and consideration must be given to the specific application or requirement.

A second category of problems requires modification of the realization rules because the resulting networks fail to met the transmission specifications. In particular, the output currents may be of the wrong polarity or greatly reduced in magnitude. Why do the realization rules fail? The discussion of FIGURE 4 indicated that the auxiliary series bias-voltage sources $E_1$, $E_2$, $E_3$ shown in FIGURE 3 could be eliminated because the voltage drop across conducting diodes is of sufficient magnitude to reverse bias diodes which are to remain nonconducting. The elimination of the bias-voltage sources is always possible, and the practical advantages of a technique which employs diodes only and does not require numerous floating voltage sources is obvious. Although the elimination of the bias-voltage sources for all single-stage gates presents no difficulty, certain precautions must be observed when the transmission function requires multistage gates. A requirement of multistage gates is that the output of all stages must effectively represent current sources (for every possible state of the inputs) to drive the succeeding stages properly. The output of a stage will fail to represent a current source if for any specified input state all diodes in the stage become conducting. Current-operated diode logic gates having a stage wherein all diodes conduct may not satisfy the desired transmission specifications. However, expenience gained in designing logic circuits for the static multiplier and numerous other gates indicates such difficulties to be the exception and not the rule. Furthermore, only minor network modifications are required to correct the transmission, and it is simpler to treat malfunctioning realizations as special cases. The remedy usually requires the addition of one or more strategically located diodes. These additional diodes will be referred to as "redundant" diodes because they perform no "logical" function. In certain instances, the addition of a redundant diode permits, oddly enough, the omission of another diode which appears to be "logically" required. Diodes which may be omitted without affecting the transmission of the gate will be referred to as "superfluous" diodes.

Figure 12A:
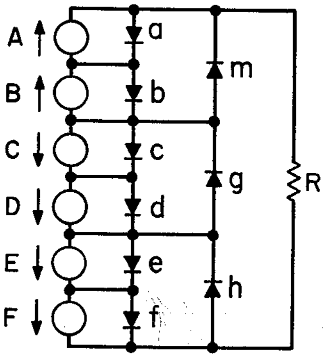
FIGURE 12 is schematic diagrams of cascaded "and/or" circuits which illustrate the use of redundant diodes.
Figure 12B:
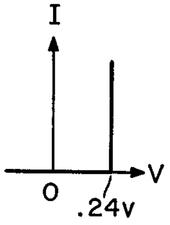
Figure 12C:
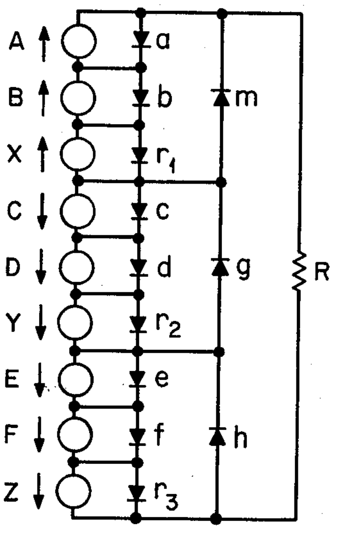

The first class of networks to be discussed is that of two-stage realizations representative of the minimum-sum or minimum-product forms of the transmission function. FIGURE 12($a$) shows the current-operated realization of the function $T=AB+CD+EF$. A sketch of the $v$.-I characteristics representing the equivalent circuit of a non-ideal germanium diode is included for reference in FIGURE 12($b$). Assume the input state $A=B=1$ and $C=D=E=F=0$ in FIGURE 12($a$), the output should be 1, with current down through the load. The measured output current of this circuit will be approximately zero for this particular input state. The current meshes will be A—$a$, B—$b$, C—D—E—F—$h$—$g$. In order for current to flow down through the load R, the cumulative terminal voltage of current sources A and B must exceed 0.48 volt to overcome the voltage drop of the two conducting diodes $g$ and $h$ in the second stage. However, the the diodes $a$ and $b$ faced by sources A and B respectively will conduct as soon as the terminal voltge equals 0.24 volt and limit the terminal voltage of each source A and B to this value. Therefore, the voltage drops across the conducting diodes $a$, $b$, $g$, $h$ will exactly cancel and no current will flow in the mesh composed of these diodes and load R. The identical results will be obtained if only C and D or E and F are equal to 1. Several solutions suggest themselves; one is to use six silicon diodes (voltage drop≈0.7 volt) in the first stage and three germanium diodes in the second stage. The terminal voltage of the input current sources A, B must be of sufficient magnitude to overcome the voltage drop of the two conducting germanium diodes *g, h*. However, this voltage (0.48 volt) impressed across two silicon diodes *a, b*, in series is insufficient to cause appreciable conduction, and thus the current will be restrained to circulate in the proper mesh B—A—R—*h*—*g*. Another solution is to use two series-connected germanium diodes instead of each silicon diode.

A second method for correcting the malfunction of FIGURE 12(*a*) requires the addition of three redunant diodes, $r_1$, $r_2$, $r_3$, one in each first stage multiply gate. These diodes are shown in FIGURE 12(*c*) and the "*r*" indicates that they are redundant. The associated current sources are labeled X, Y, and Z. The diodes $r_1$, $r_2$, $r_3$ effectively simulate bias-voltage sources when energized by sources X, Y and Z which could be simply unit current sources causing the diodes $r_1$, $r_2$, $r_3$ to conduct and exhibit a voltage drop of 0.24 volt. Another alternative exists: source X could be either a second source A or B, source Y could be either a second source C or D, and source Z could be either a second source E or F.

The "general rule" for avoiding a malfunctioning circuit applicable to two-stage realizations is that the number of inputs to all first-stage gates must be equal to or greater than the number of inputs to the second-stage gates. From a geometrical standpoint, this implies that there must be at least as many series-connected diodes in each gate in the first column (stage) as there are diodes in the second column (stage). If the general rule is applied to FIGURE 12(*c*) where there are three current inputs to the second stage diodes *m, g, h* and three current inputs A, B, X, etc. to each first stage gate, FIGURE 12(*c*) should be non-malfunctioning which it is. However, FIGURE 12(*a*) has only two current inputs A, B to the first stage diodes *a, b*, which violates the general rule and should malfunction, which it does. It is believed that the general rule may be extended to multiple-stage circuits if the rule is applied to all successive stages considered two at a time. The rule has been successfully applied to a large number of multiple-stage networks but its extension to multiple-stage networks has not been rigorously confirmed.

The second class of networks to be considered includes all multi-stage realizations which do not satisfy the desired transmission specifications because series bias-voltage sources are absent. This miscellaneous category also includes networks which may be further minimized, not by algebraic methods but from operational considerations which show that a particular diode is not required to conduct for any state of the inputs, a "superfluous" diode. The circuit of FIGURE 13(*a*) will be used to illustrate these points. This circuit contains a diode *s* which is superfluous although "logically" required for the realization of the desired transmission function. In the current-operated gate, this diode *s* may be removed and replaced by an open circuit. Experimentation showed the gate of FIGURE 13(*a*) to malfunction for the input states $A=B=C=0$ and $D=E=F=1$ shown by the direction arrows associated with the corresponding current sources. The desired transmission function is $T=DEF(AB+B'C)$ and for the given input state the transmission should be equal to 0 but was found to be 1. The reason for the malfunction is that insufficient voltage was established by the first-stage sources A, B and C, due to the presence of the two series diodes 131, 132 in the second stage, to overcome the cumulative voltage developed across the conducting diodes *d, e* and *f* faced by generators D, E and F. Since the voltage drop across the load R is small, the voltage across the series connection of diodes *d, e* and *f* must equal the voltage across the series connections of diodes 131 and 132 because the voltage drop around a loop containing elements R, *d, e, f*, 131, 132 must be zero. The voltage across the individual diodes 131 and 132 is, therefore, greater than the voltage across the individual diodes *d, e* and *f*. Since the diodes are identical, more current must flow through diodes 131 and 132 than flows through diodes *d, e* and *f*. The current flow paths 133 through 138 of FIGURE 13(*a*) satisfy these diode current requirements and show that the current through load R flows down which is the incorrect direction.

Many acceptable solutions exist, and a straightforward solution is obtained by expanding the function and then synthesizing the result, $T=DEFAB+DEFB'C$. This requires two more diodes and three additional inputs. However, the solution shown in the diagram of FIGURE 13(*b*) was selected because the network is more minimal and it illustrates the presence of a superfluous diode, *s*. Adding the redundant diode *r* in FIGURE 13(*b*) solves the problem because it reduces, by a factor of three, the voltage across the three diodes *d, e*, and *f* faced by sources D, E and F when inputs D, E, F are in state 1.

Figure 13A:
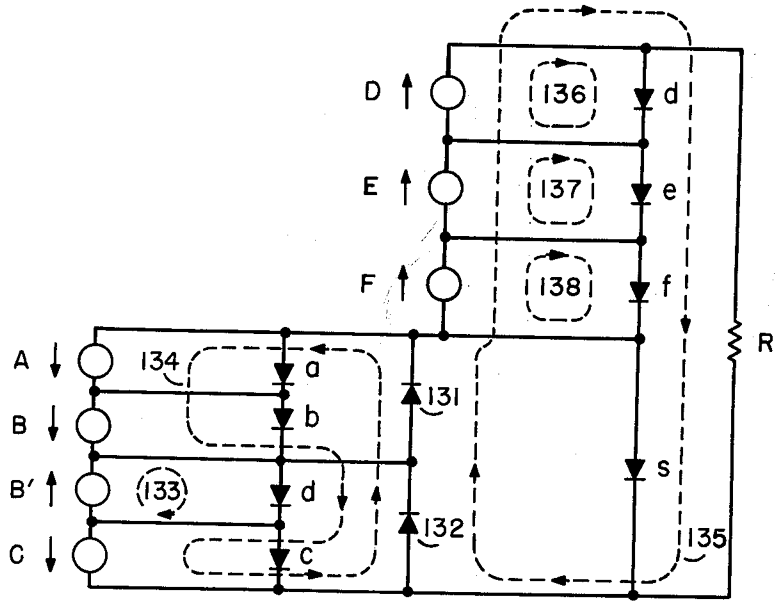
FIGURE 13 illustrates cascaded "and/or" circuit schematic diagrams which contain a superfluous diode.
Figure 13B:
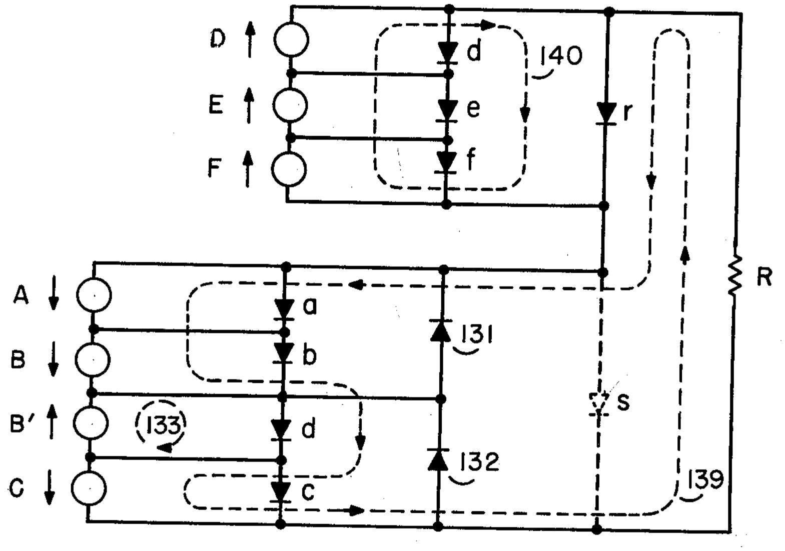

The necessity for and the placement of one or more redundant diodes *r* in a circuit which has been obtained directly from a transmission function T as was FIGURE 13(*a*) has been determined directly from inspection of FIGURE 13(*a*) without testing the circuit for all possible input states of the variables. Extending the "general rule" applicable to two-stage realizations to FIGURE 13(*a*), the number of current inputs (two) to the add gate comprising diodes 131 and 132 is less than the number of current inputs (four) to the next successive gate comprising diodes *d, e, f* and *s*. This violates the general rule and the circuit of FIGURE 13(*a*) should malfunction, which it does. In order to satisfy the general rule, it is possible to add a diode *r* to the circuit of FIGURE 13(*a*) as shown in FIGURE 13(*b*). The circuit of FIGURE 13(*b*) has been drawn to make apparent the various gates. It is seen that the addition of diode *r* has created a situation where the gate comprising diodes *r* and *s* has two current inputs. Since this gate follows the gate comprising diodes 131 and 132 (two current inputs) and also follows the gate comprising diodes *d, e*, and *f* (three current inputs), the general two-stage realization rule is satisfied and the circuit will produce the transmission function from which it was synthesized. The current meshes after adding diode *r*, as shown in FIGURE 13(*b*), are meshes 139, 140, and 133 with the current direction in mesh 139 through load R in the upward direction ($T=0$) indicating the correct value of the transmission function for the input states $A=B=C=0$ and $$D=E=F=1$$

The "general rule" extension described above has been applied successfully to the other multistage "and/or" circuits by satisfying the realization rule for any two successive stages regardless of their location in the multistage circuit.

The superfluous diode, *s* shown dotted in FIGURE 13(*b*) "logically" required by the realization rules, may be eliminated since all four series input current sources A, B, B' and C cannot simultaneously be equal to 1 which would require the presence of the path provided by this diode. Currents flowing between the nodes to which the superfluous diode *s* is connected are required to choose paths established in the network to the left of this diode because of the nature of the function.

One remark concerning the realization of transmission functions must be made because it occurs frequently. If a hybrid realization were considered for the realization of the transmission function $T=DEF(AB+B'C)$, the portion of the transmission function represented by $(AB+B'C)$ could be synthesized using a lattice consisting of four diodes. This lattice, in addition to the four diodes, *d, e, f, s* of FIGURE 13(*a*) required to form the product of D, E, F, and $(AB+B'C)$ would complete the circuit. The hybrid circuit was constructed, and the correct transmission was experimentally verified for all input states. It satisfied the desired transmission equation with a total of eight diodes. Experience has proved, in many instances, that the more minimal network operates satisfactorily, whereas a less minimal realization may exhibit malfunctions for certain input states.

In conclusion, the realization rules applicable to the design of current-operated diode logic gates have been presented, and two methods have been discussed. Either the "and/or" or the lattice method is capable of realizing any general transmission function. Hybrid and multiple output circuits offer additional economies beyond those available using multistage circuits. Certain transmission functions were extensively considered to illustrate the interconnection of the "and/or" and the lattice circuits whereby any transmission function can be synthesized.

The particular values of load resistors used in the current-operated logic gates are not to be construed as limiting. In some circuits a 40 ohm load resistor was used because this was the resistance of the meter used to measure amplitude and direction of the load current. In other circuits a 470 ohm load was chosen because it produced a voltage drop which was large enough to reliably actuate a voltage sensitive buffer amplifier connected to the load. For any given gate circuit, the smaller the value of the load resistance, the more closely will the load current approach the source current amplitude. Larger values of load resistance will cause some of the source current to be diverted to "non-conducting" diode meshes but the current direction in the load will not reverse to give an incorrect transmission. The circuits of FIGURES 4 and 7 have been analyzed for the extreme case where the load impedance is infinite. The polarity of the voltage for this load impedance for different input states of the current sources is the same as if a 40 or 470 ohm load resistor were used. It is reasonable to assume that other current-operated gate circuits would perform similarly for high impedance loads since merely increasing the load resistance will not suffice to produce reversal of current flow in the load mesh.

While certain specific and alternative embodiments of our invention are described above, many modifications can be made. It is to be understood, therefore, that we intend, by the appended claims, to include all such modifications as fall within the true spirit and scope of the invention.

What we claim as our invention is:

1. A diode switching circuit responsive to the direction of current as a binary variable to perform a predetermined logic function comprising, a plurality of input current sources, one for each input variable, each of said sources being adjustable to produce an input current flow having a direction representing the binary value of said input, a load impedance, said sources being connected in a closed series loop with said load, a plurality of semiconductor diodes, each junction of adjacent sources in said series loop being connected to a pair of diodes oppositely poled for current flow toward and away from said junction, said diodes also being connected to provide at least one series circuit shunting said load, the diodes being polarized for conduction according to said function, thereby forming a series-parallel network having a plurality of meshes such that there is a diode shunt path for each current source for each direction of current flow therein, whereby each conducting diode carries current in two of said meshes and develops a voltage drop of a polarity to maintain a reverse bias on non-conducting diodes, thereby causing current flow in said load to occur in a predetermined direction for specified states of said input variables and causing any current of opposite direction of flow to be shunted from said load.

2. A current operated diode switching circuit for directing the current flow through a load in a direction specified by the binary states of a plurality of input variables according to a predetermined transfer function, comprising, a plurality of input bi-directional current sources, each providing a direction of current flow representing the binary state of one of said variables, a load impedance, said sources being connected in a closed series loop with said load, a plurality of diodes, said diodes being connected to provide a pair of diodes with opposite polarity at each junction between adjacent sources in said series loop and at least one shunt path around said load, the direction of current flow in said load shunt path being specified by said transfer function, thereby forming a series parallel network of meshes to provide a first path for current flow toward each junction between sources and a second path for current flow away from each of said junctions, whereby the current flow of any source in a direction opposing the current flow specified by said transfer function in said load is circulated through a conductive diode mesh excluding said load and the current through said load is shunted around said opposing source by a conductive diode such that each conductive diode carries the current flowing in two of said meshes.

3. A diode switching circuit, responsive to a plurality of bidirectional current sources, each having a direction of current flow representing the binary state of an input variable to direct current flow through a load in a direction specified by the binary states of the input variables according to a predetermined transfer function, comprising, a bidirectional current source for each input variable, a load impedance, a plurality of diodes at least equal in number to the number of said current input sources, said sources being connected in a closed series loop with said load, said diodes being connected to shunt each source and said load by at least one diode in a series-parallel network having a plurality of meshes, such that the current flow through said load in the direction specified by said function is shunted around a current source having a current flow opposed thereto by a conductive diode path, said conductive diode providing a path for the current in said opposed sources in a mesh shunting said load.

4. A diode logic circuit comprising a first, second, third and fourth diode each diode having an anode terminal and a cathode terminal, a first, second and third bi-directional current source of substantially equal magnitude, a load, a serial connection of said first, second, third and fourth diodes, each of said diodes having its anode connected to the cathode of the adjacent diode, said first current source being connected between the junction of said first and second diodes and the junction of said third and fourth diodes, said second current source being connected in parallel with said second diode, said third current source being connected in parallel with said fourth diode, and said load connected between the junction of said second and third diodes and the junction of said first and fourth diodes.

5. A digital logic circuit comprising a first and second current source, a first and second diode, having an anode and cathode, a load, said first bidirectional current source being connected in parallel with said first diode, said second bidirectional current source being connected in parallel with said second diode, the anode of said first diode being connected to the cathode of said second diode, said load having a first and second terminal, the first terminal of said load being connected to the cathode of said first diode and the second terminal of said load being connected to the anode of said second diode.

6. A current-operated diode logic network comprising a plurality of current-operated diode logic gates of the "and/or" type with output terminals serially connected to form a first stage, the diodes of said first stage gates being polarized for the same direction of current flow, each gate of said first stage having a current output, a second current-operated diode logic gate of the "and/or" type with output terminals, said second gate having a plurality of current inputs at least equal to the number of gates in said first stage, each of said first stage gate outputs being connected as a current source to a different input of said second gate, bi-directional current sources being connected to other remaining inputs of said second gate, each of said first stage gates having a plurality of current input sources at least equal to the number of current inputs to said second gate, and a load impedance connected to the output of said second gate.

7. A current-operated diode logic network comprising a plurality of and/or current-operated diode logic gates serially connected to form a first stage having output terminals, the diodes of said first stage gates being connected to each other cathode to anode, bi-directional current sources connected to each of said diodes, each gate of said first stage and/or having a current output, a second stage current-operated diode logic gate having serially connected diodes of polarity opposite to that of said first stage diodes, said second gate having a plurality of current inputs at least equal to the number of gates in said first stage, each of said first stage gate outputs being connected to a different one of said serially connected diodes in said second gate, bi-directional current sources being connected to the remaining serially connected diodes in said second gate, shunting diodes, each shunting diode connected across two or more of said serially connected diodes of said second gate, said shunting diode being polarized in the same direction as the shunted diodes, to produce a series-parallel arrangement of diodes in said second gate wherein the minimum number of diodes in any serial path from one output terminal of said second gate to the other output terminal is no greater than the minimum number of diodes in any first stage gate.

8. A current operated diode logic circuit responsive to a number of binary input variables to produce a binary output current representing a predetermined mathematical operation on said inputs comprising, a bi-directional input current source for each input variable, said sources being adapted to produce a direction of current flow representing a binary input state, said sources being connected in a series circuit to a pair of output terminals, a plurality of semiconductor diodes exceeding in number said input sources, each node of said series circuit being provided with a pair of diodes oppositely poled to provide current flow toward and away from said node, said diodes being connected into a pair of circuits polarized in accordance with said mathematical operation to shunt said output terminals for each direction of current flow, whereby currents from adjacent sources having opposite binary states cause conduction through at least one diode to shunt said output current around any source having a current opposed thereto and shunting the current of any opposed source around said output terminals, the voltage drop across a conducting diode acting to apply a reverse bias to non-conducting diodes.

9. A current-operated diode logic circuit in which the direction of current in bi-directional current sources represents the presence of binary ones or zeros as the inputs, and the direction of current in an output load impedance represents a predetermined transfer function for a particular set of input directions of the current sources comprising, a plurality of bi-directional current sources connected serially to said load, the junction of each current source to adjacent current sources being designated as a node, a plurality of diodes, at least equal in number to said sources, at least one different pair of oppositely poled diodes being connected to each node, the remaining terminals of said plurality of diodes being connected to other junctions of said serial connection with a polarity providing current flow in a direction specified by said transfer function.

10. A current-operated diode logic circuit in which the direction of current in bi-directional current sources represents the presence of binary ones or zeros as the inputs, and the direction of current in an output load impedance represents a predetermined transfer function for a particular set of input directions of the current sources comprising, a plurality of bi-directional current sources serially connected at terminals, those terminals occurring at the junction of each current source to an adjacent current source being designated as nodes, a plurality of diodes, at least equal in number to said sources, each node being connected to at least two oppositely poled diodes by one terminal of each of said diodes, a first of said diodes being connected across one current source connected to said node, a second of said diodes being connected across the remaining current source connected to said node, the terminals of any remaining diodes connected to a node being connected to terminals of said series connection of current sources other than the terminals to which said first and second diodes are connected, the particular connections of said diodes determining said transfer function.

References Cited in the file of this patent

UNITED STATES PATENTS 2,220,098 Guanella -------------- Nov. 5, 1940